US012795104B2

(12) United States Patent
Radford et al.

(10) Patent No.: US 12,795,104 B2
(45) Date of Patent: Nov. 10, 2026

(54) AUTOMATED AVOIDANCE OF MEDIA FILE ENCODING REDUNDANCIES

(71) Applicant: Disney Enterprises, Inc., Burbank, CA (US)

(72) Inventors: Michael A. Radford, Bainbridge Island, WA (US); Mark Arana, Agoura Hills, CA (US)

(73) Assignee: Disney Enterprises, Inc., Burbank, CA (US)

( * ) Notice: Subject to any disclaimer, the term of this patent is extended or adjusted under 35 U.S.C. 154(b) by 185 days.

(21) Appl. No.: 18/217,307

(22) Filed: Jun. 30, 2023

(65) Prior Publication Data

US 2025/0008109 A1 Jan. 2, 2025

(51) Int. Cl.

| | |
|---|---|
| ***H04N 21/8358*** | (2011.01) |
| ***H04L 9/32*** | (2006.01) |
| ***H04N 19/134*** | (2014.01) |
| ***H04N 19/85*** | (2014.01) |
| ***H04N 21/2343*** | (2011.01) |
| ***H04N 21/8352*** | (2011.01) |
| ***H04N 21/845*** | (2011.01) |
| ***H04N 21/854*** | (2011.01) |

(52) U.S. Cl.

CPC ......... *H04N 19/134* (2014.11); *H04L 9/3239* (2013.01); *H04N 19/85* (2014.11); *H04N 21/23439* (2013.01); *H04N 21/8352* (2013.01); *H04N 21/8358* (2013.01); *H04N 21/8456* (2013.01); *H04N 21/85406* (2013.01)

(58) Field of Classification Search

CPC ........... H04N 21/8358; H04N 21/8352; H04N 21/85406; H04N 21/23439; H04N 21/8456; H04N 19/85; H04N 19/134

See application file for complete search history.

(56) References Cited

U.S. PATENT DOCUMENTS

| | | | | |
|---|---|---|---|---|
| 11,133,037 | B1 * | 9/2021 | Kalish | G06F 16/745 |
| 2007/0250901 | A1 * | 10/2007 | McIntire | H04N 21/47815<br>348/E7.071 |
| 2012/0030209 | A1 * | 2/2012 | Bause | G06F 16/48<br>707/741 |
| 2013/0326352 | A1 * | 12/2013 | Morton | G06F 3/0484<br>715/719 |
| 2016/0219310 | A1 | 7/2016 | Shibata | |

(Continued)

OTHER PUBLICATIONS

Extended European Search Report dated Oct. 21, 2024 for EP Application 24177013.0-1207.

U.S. Appl. No. 18/123,644, filed Mar. 20, 2023.

*Primary Examiner* — Pinkal R Chokshi

(74) *Attorney, Agent, or Firm* — Farjami & Farjami LLP

(57) ABSTRACT

A system includes a hardware processor and a memory storing software code. The hardware processor executes the software code to receive video frames, generate a unique identifier for association with the video frames, and determine whether the unique identifier is stored. If the unique identifier is stored, the software code is further executed to identify an encoded media file associated with the unique identifier, the encoded media file including encoded video frames corresponding respectively to the received video frames. If the unique identifier is not stored, the software code is further executed to encode the video frames to produce the encoded media file, and store the unique identifier.

20 Claims, 4 Drawing Sheets

(56) References Cited

U.S. PATENT DOCUMENTS

| | | | | |
|---|---|---|---|---|
| 2020/0044855 | A1* | 2/2020 | Winarski | H04N 21/835 |
| 2020/0296468 | A1* | 9/2020 | Wittke | H04N 21/4751 |
| 2022/0020397 | A1* | 1/2022 | Kalish | H04N 21/2393 |

* cited by examiner

AUTOMATED AVOIDANCE OF MEDIA FILE ENCODING REDUNDANCIES

BACKGROUND

Media packages for audio-video (AV) content include collections of media files. In order to distribute numerous localized versions of the AV content that are variously compliant with local censorship requirements, consistent with localized imagery for a given geographical region, or both, each media package may differ slightly in the makeup of the collection of media files it contains. The same is true of audio content, where dubbed audio may be used. Analogously, timed text may be added or changed depending on the requirements in each locale.

However, media files can be very large and time consuming to encode. Due to the typically high degree of redundant underlying media content in each localized version of a media package, systems that build media packages representing all localized versions of a feature are faced with the challenge of identifying media files that can be reused across the set of localized versions, in order to avoid the costs and inefficiencies resulting from the unnecessary encoding of media files that are already available. Thus, there is a need in the art for a solution enabling identification of existing media files suitable for reuse, in order to avoid media file encoding redundancies.

DETAILED DESCRIPTION

Figure 1:
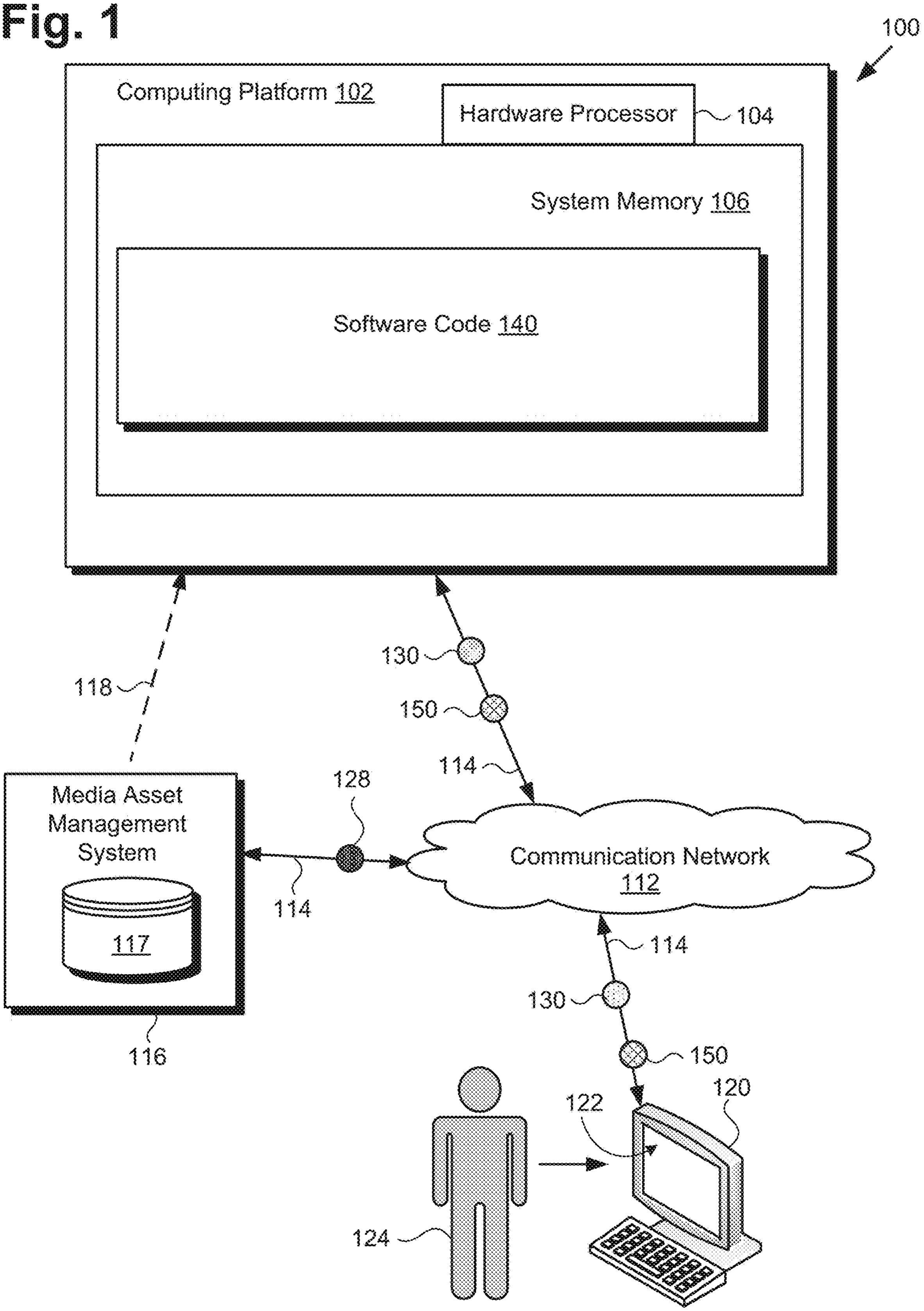
FIG. 1 shows an exemplary system for automating avoidance of media file encoding redundancies, according to one implementation.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

Media packages for audio-video (AV) content, such as Interoperable Master Format (IMF) packages for example, include collections of media files, such as Media Exchange Format (MXF) video track files for instance. As stated above, in order to distribute numerous localized versions of AV content that are variously compliant with local censorship requirements, consistent with localized imagery for a given geographical region, or both, each media package may differ slightly in the makeup of the collection of media files it contains. The same is true of audio content, where dubbed audio may be used. Analogously, timed text may be added or changed depending on the requirements in each locale.

However, media files such as MXF video track files, can be very large and time consuming to encode. Accordingly, and due to the typically high degree of redundant underlying media content in each localized version of a media package, systems that build media packages representing all localized versions of a feature face the challenge of identifying media files that can be reused across the set of localized versions, in order to avoid the costs and inefficiencies resulting from the unnecessary encoding of media files that are already available.

The present application discloses systems and methods that address and overcome the challenge described above by automating avoidance of media file encoding redundancies. The automated solution disclosed by the present application advances the state-of-the-art by providing a media file focused approach to identifying redundant content for inclusion in a media package, thereby advantageously enabling the cost reductions and efficiencies resulting from reuse of existing media file encodings. Various implementations of the present application may be utilized in co-pending U.S. application Ser. No. 18/123,644, filed Mar. 20, 2023, and titled "Automation of Differential Media Uploading," which is hereby incorporated by reference in its entirety into the present application.

It is noted that, as defined for the purposes of the present application, the terms "automation." "automated." and "automating" refer to systems and processes that do not require the participation of a human system administrator. Although in some implementations the media file redundancy determinations made by the systems and methods disclosed herein may be reviewed or even modified by a human system administrator, that human involvement is optional. Thus, the methods described in the present application may be performed under the control of hardware processing components of the disclosed systems.

It is also noted that the types of media content to which the present automated solution may be applied include AV content having both audio and video components, audio unaccompanied by video, and video unaccompanied by audio. In addition, or alternatively, in some implementations, the type of media content to which the present novel and inventive solution can be applied may be or include digital representations of persons, fictional characters, locations, objects, and identifiers such as brands and logos, for example, which populate a virtual reality (VR), augmented reality (AR), or mixed reality (MR) environment. Moreover, that content may depict virtual worlds that can be experienced by any number of users synchronously and persistently, while providing continuity of data such as personal identity, user history, entitlements, possessions, payments, and the like. It is noted that the solution disclosed by the present application may also be applied to content that is a hybrid of traditional audio-video and fully immersive VR/AR/MR experiences, such as interactive video.

FIG. 1 shows exemplary system 100 for automating avoidance of media file encoding redundancies, according to one implementation. As shown in FIG. 1, system 100 includes computing platform 102 having hardware processor 104, and system memory 106 implemented as a computer-readable non-transitory storage medium. According to the present exemplary implementation, system memory 106 stores software code 140.

As further shown in FIG. 1, system 100 may be implemented in a use environment including media asset management system 116 having unique identifier database 117, communication network 112, and user 124 utilizing client system 120 including display 122 to interact with system 100. That is to say, user 124 is a user of system 100 as well as of client system 120. In addition, FIG. 1 shows network communication links 114 communicatively coupling media asset management system 116 and client system 120 with system 100 via communication network 112. Also shown in FIG. 1 are plurality of video frames 130 received by system 100 from client system 120, encoded media file 150 including a plurality of encoded video frames corresponding respectively to plurality of video frames 130, and unique identifier 128 associated with plurality of video frames 130 and also associated with encoded media file 150.

It is noted that although system 100 may be communicatively coupled to media asset management system 116 via communication network 112 and network communication links 114, in some implementations, media asset management system 116 including unique identifier database 117 may be integrated with computing platform 102 of system 100, or may be in direct communication with system 100, as shown by dashed communication link 118.

Although the present application refers to software code 140 as being stored in system memory 106 for conceptual clarity, more generally, system memory 106 may take the form of any computer-readable non-transitory storage medium. The expression "computer-readable non-transitory storage medium," as defined in the present application, refers to any medium, excluding a carrier wave or other transitory signal that provides instructions to hardware processor 104 of computing platform 102. Thus, a computer-readable non-transitory medium may correspond to various types of media, such as volatile media and non-volatile media, for example. Volatile media may include dynamic memory, such as dynamic random access memory (dynamic RAM), while non-volatile memory may include optical, magnetic, or electrostatic storage devices. Common forms of computer-readable non-transitory storage media include, for example, optical discs, RAM, programmable read-only memory (PROM), erasable PROM (EPROM), and FLASH memory.

It is further noted that although FIG. 1 depicts software code 140 as being located in a single instance of system memory 106 that representation is also merely provided as an aid to conceptual clarity. More generally, system 100 may include one or more computing platforms, such as computer servers for example, which may be co-located, or may form an interactively linked but distributed system, such as a cloud-based system, for instance. As a result, hardware processor 104 and system memory 106 may correspond to distributed processor and memory resources within system 100. Thus, it is to be understood that software modules included in software code 140 and described in greater detail below by reference to FIG. 2 may be stored remotely from one another within the distributed memory resources of system 100.

Hardware processor 104 may include multiple hardware processing units, such as one or more central processing units, one or more graphics processing units, and one or more tensor processing units, one or more field-programmable gate arrays (FPGAs), custom hardware for machine-learning training or, and an application programming interface (API) server, for example. By way of definition, as used in the present application, the terms "central processing unit" (CPU). "graphics processing unit" (GPU), and "tensor processing unit" (TPU) have their customary meaning in the ail. That is to say, a CPU includes an Arithmetic Logic Unit (ALU) for carrying out the arithmetic and logical operations of computing platform 102, as well as a Control Unit (CU) for retrieving programs, such as software code 140, from system memory 106, while a GPU may be implemented to reduce the processing overhead of the CPU by performing computationally intensive graphics or other processing tasks. A TPU is an application-specific integrated circuit (ASIC) configured specifically for artificial intelligence applications such as machine learning modeling.

In some implementations, computing platform 102 may correspond to one or more web servers, accessible over a packet-switched network such as the Internet, for example. Alternatively, computing platform 102 may correspond to one or more computer servers supporting a private wide area network (WAN), local area network (LAN), or included in another type of limited distribution or private network. In addition, or alternatively, in some implementations, system 100 may utilize a local area broadcast method, such as User Datagram Protocol (UDP) or Bluetooth, for instance. Furthermore, in some implementations, system 100 may be implemented virtually, such as in a data center. For example, in some implementations, system 100 may be implemented in software, or as virtual machines. Moreover, in some implementations, communication network 112 may be a high-speed network suitable for high performance computing (HPC), for example a 10 GigE network or an Infiniband network.

Although client system 120 is shown as a desktop computer in FIG. 1, that representation is provided merely as an example as well. More generally, client system 120 may be any suitable mobile or stationary computing device or system that implements data processing capabilities sufficient to provide a user interface, support connections to communication network 112, and implement the functionality ascribed to client system 120 herein. For example, in other implementations, client system 120 and may take the form of a laptop computer, tablet computer, or smartphone. In still other implementations, client system 120 may be peripheral device of system 100 in the form of a dumb terminal. In those implementations, client system 120 may be controlled by hardware processor 104 of computing platform 102.

With respect to display 122 of client system 120, display 122 may be physically integrated with client system 120, or may be communicatively coupled to but physically separate from client system 120. For example, where client system 120 is implemented as a smartphone, laptop computer, or tablet computer, display 122 will typically be integrated with client system 120. By contrast, where client system 120 is implemented as a desktop computer, display 122 may take the form of a monitor separate from client system 120 in the form of a computer tower. Furthermore, display 122 of client system 120 may be implemented as a liquid crystal display (LCD), a light-emitting diode (LED) display, an organic light-emitting diode (OLED) display, a quantum dot (QD) display, or any other suitable display screen that performs a physical transformation of signals to light.

Figure 2:
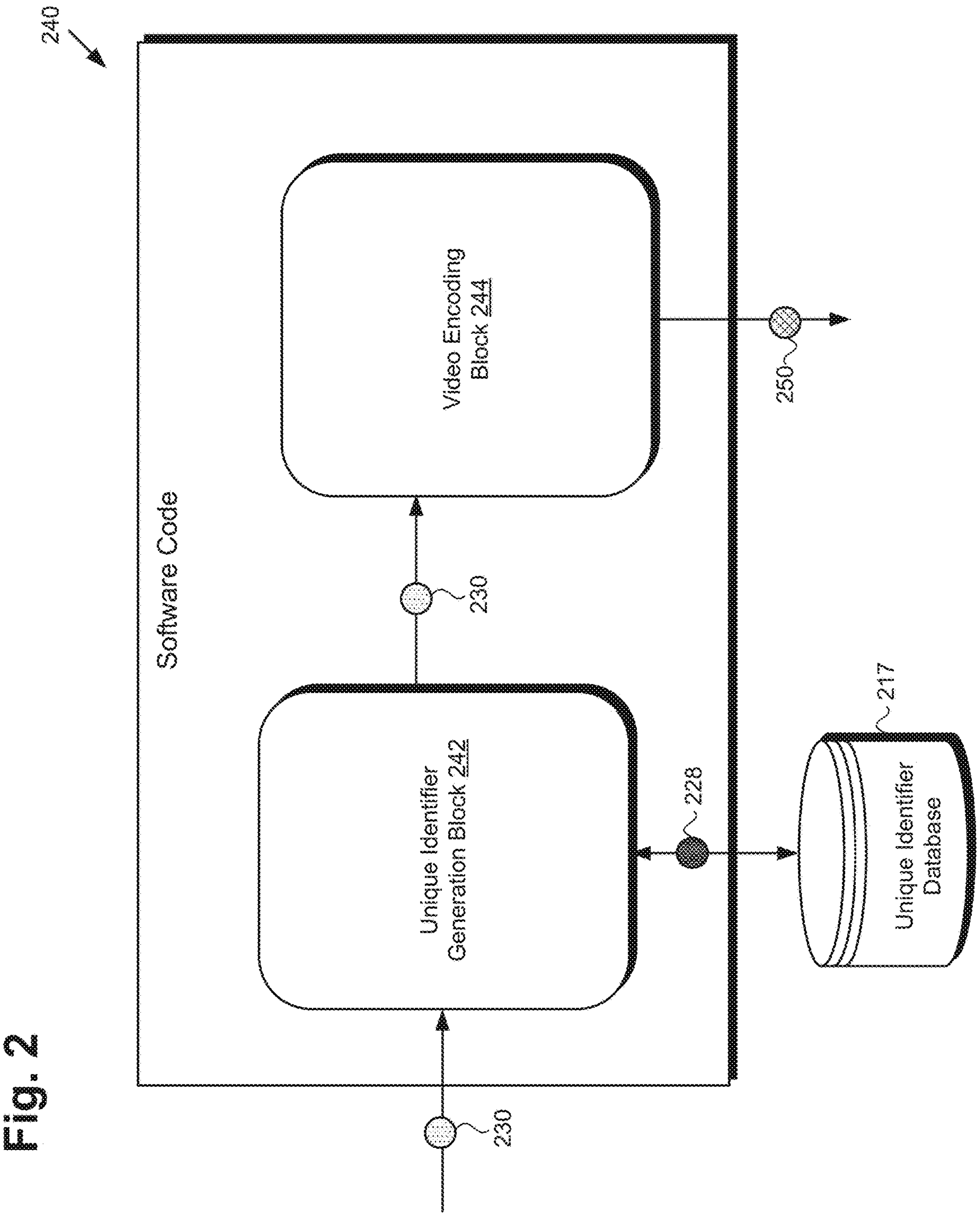
FIG. 2 shows a block diagram of an exemplary software code suitable for use by the system shown in FIG. 1, according to one implementation.

FIG. 2 shows a diagram of exemplary software code 240 suitable for use by system 100, in FIG. 1, according to one implementation. As shown in FIG. 2, software code 240 includes unique identifier generation block 242 and video encoding block 244. As further shown in FIG. 2, software code 240 receives plurality of video frames 230 as input, generates unique identifier 228 for association with plurality of video frames 230, and communicates with unique identifier database 217 of a media asset management system to determine whether unique identifier 228 is stored by the media asset management system. In use cases in which it is determined that unique identifier 228 is stored by the media asset management system (i.e., is already present in unique identifier database 217), software code 240 identifies encoded media file 250 associated with unique identifier 228, where encoded media file 250 includes a plurality of encoded video frames corresponding respectively to plurality of video frames 230. In use cases in which it is determined that unique identifier 228 is not stored by the media asset management system (i.e., is not present in unique identifier database 217), software code 240 encodes plurality of video frames 230 to provide encoded media file 250 and stores unique identifier 228 associated with encoded media file 250 to unique identifier database 217 of the media asset management system. As also shown in FIG. 2, software code 240 may provide encoded media file 250 as an output.

Software code 240, plurality of video frames 230, unique identifier 228, encoded media file 250, and unique identifier database 217 correspond respectively in general to software code 140, plurality of video frames 130, unique identifier 128, encoded media file 150, and unique identifier database 117, in FIG. 1. Consequently, software code 140, plurality of video frames 130, unique identifier 128, encoded media file 150, and unique identifier database 117 may share any of the characteristics attributed to respective software code 240, plurality of video frames 230, unique identifier 228, encoded media file 250, and unique identifier database 217 by the present disclosure, and vice versa. That is to say, like software code 240, software code 140 may include features corresponding respectively to unique identifier generation block 242 and video encoding block 244.

Figure 3:
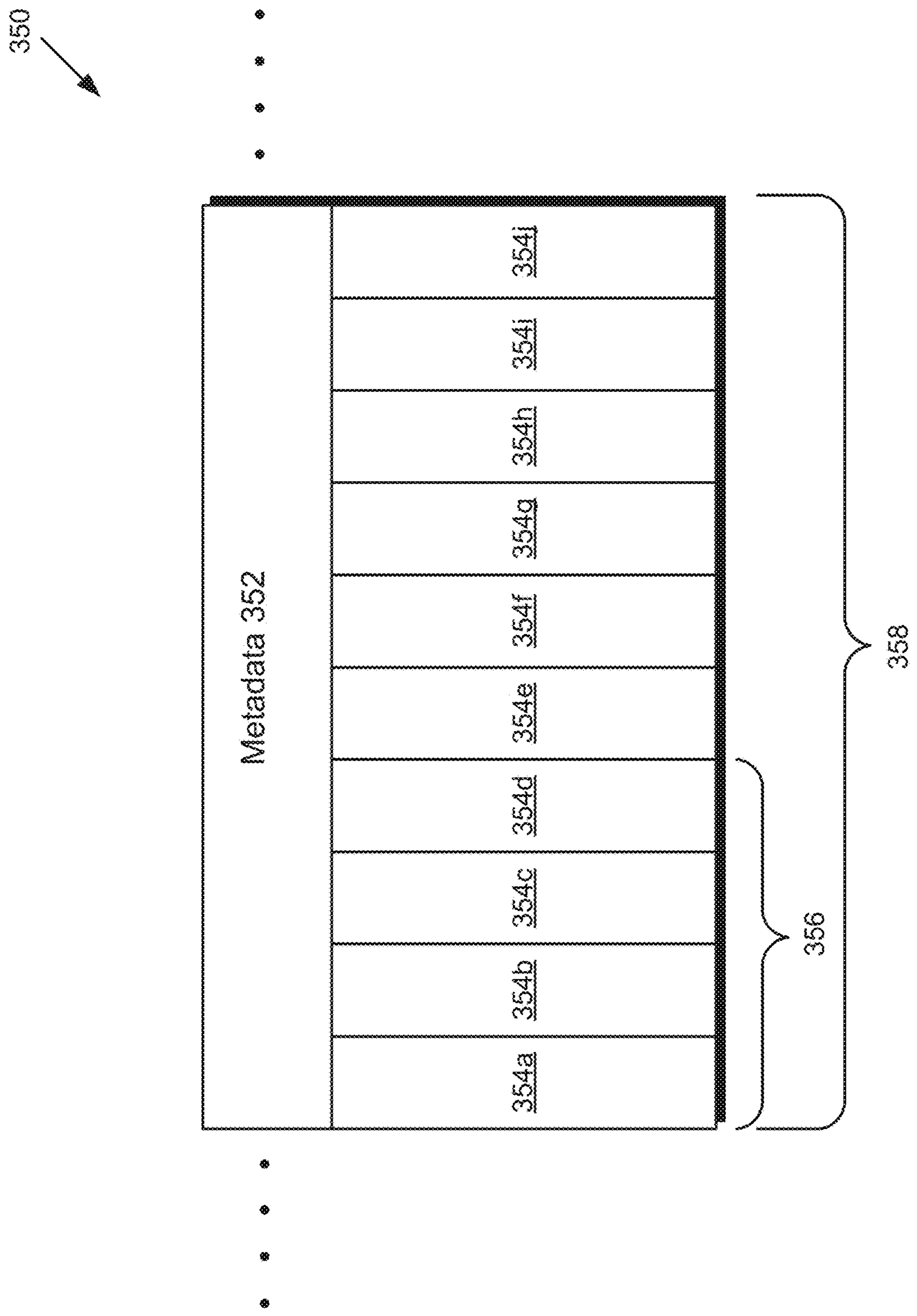
FIG. 3 shows a more detailed diagram of a portion of an encoded media file, according to one implementation.

FIG. 3 shows a more detailed diagram of a portion of encoded media file 350 in the form of a MXF video track file, according to one implementation. However, in other implementations encoded media file 350 may include media in other formats. For example, in one alternative implementation encoded media file may include a plurality of Tag Image File Format (TIFF) images. Encoded media file 350 corresponds in general to encoded media file 150/250 in FIGS. 1 and 2. Consequently, encoded media file 150/250 may share any of the characteristics attributed to encoded media file 350 by the present disclosure, and vice versa. In other words, in some implementations, encoded media file 150/250 may be or include a MXF video track file, or may include a plurality of TIFF images.

As shown in FIG. 3, encoded media file 350 includes metadata 352 and a sequence of encoded video frames **354*a*, 354*b*, 354*c*, 354*d*, 354*e*, 354*f*, 354*g*, 354*h*, 354*i*, and 354*j* (hereinafter "encoded video frames 354*a*-354*f*"). It is noted that a MXF video track file is a well-defined file format for allowing the bundling and sequencing of arbitrarily long sequences of video frames, such as encoded video frames 354*a*-554*j*, along with metadata 352 describing the video content included in those video frames, into single encoded media file 350**. MXF video track files may contain sequences of reference uncompressed video frames, or they may contain sequences of irreversibly compressed (lossy) video frames.

Depending upon the particular implementation, there may be advantages to constraining encoded media file 350 to include a predetermined creative interval of media content, to have a predetermined number of video frames, or to include a sequence of video frames having a predetermined time duration. In some implementations, for example encoded media file 350 may include encoded video frames **354*a*, 354*b*, 354*c* and 354*d* of a single shot 356 of video, while in other implementations, encoded media file 350 may include encoded video frames 354*a*-354*j* of a single scene 358** of video. It is noted that, as defined for the purposes of the present application, the expression "shot" of video refers to a sequence of video frames that are captured from a unique camera perspective without cuts or other cinematic transitions. It is further noted that as defined for the purposes of the present application, the expression "scene" of video refers to one or more shots of video that, together, deliver a single, complete and unified dramatic element of film narration, or block of storytelling within a film.

Figure 4:
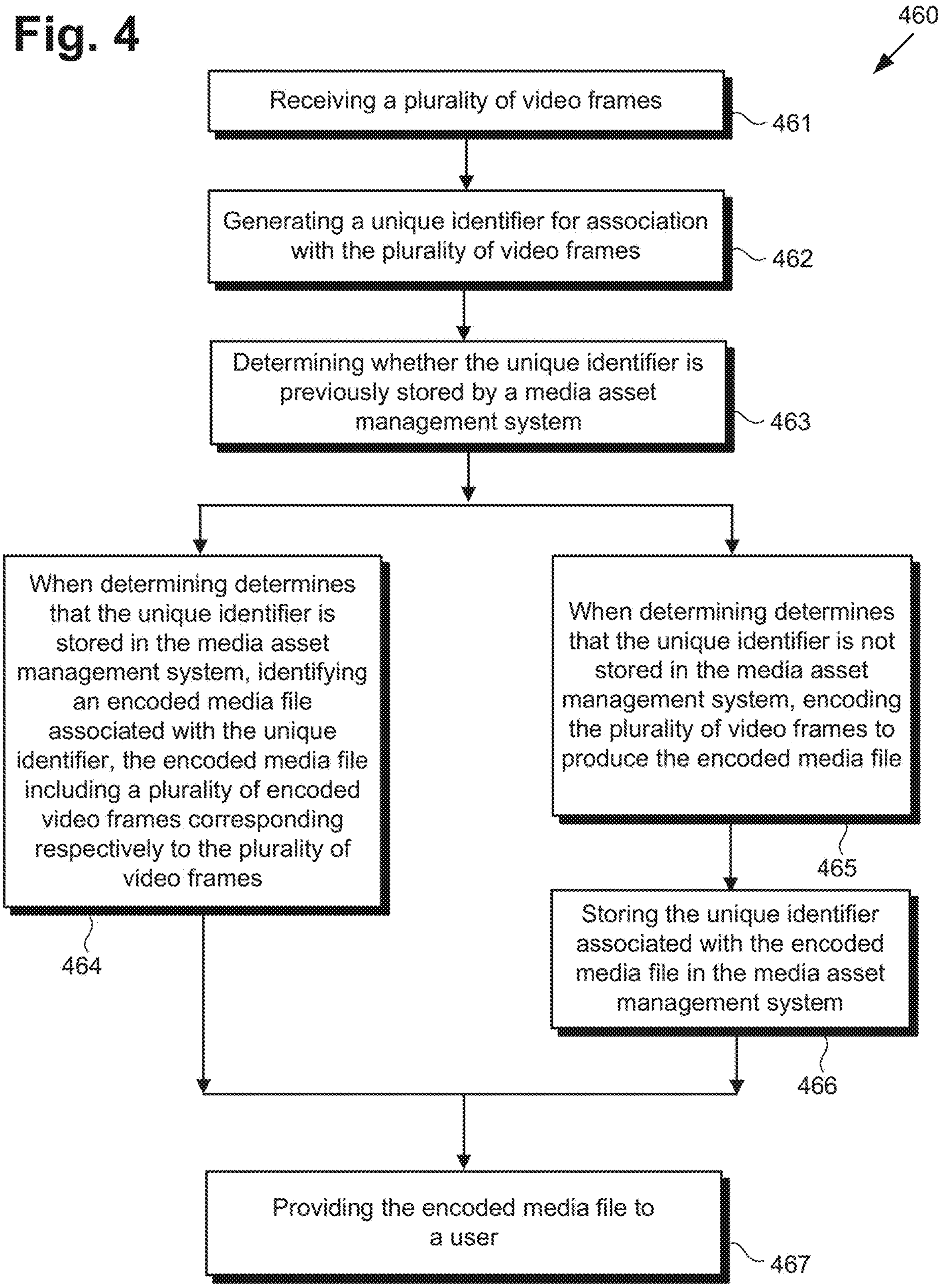
FIG. 4 shows a flowchart presenting an exemplary method for use by a system to automate avoidance of media file encoding redundancies, according to one implementation.

The functionality of software code 140/240 will be further described by reference to FIG. 4. FIG. 4 shows flowchart 460 presenting an exemplary method for use by a system to automate avoidance of media file encoding redundancies, according to one implementation. With respect to the method outlined in FIG. 4, it is noted that certain details and features have been left out of flowchart 460 in order not to obscure the discussion of the inventive features in the present application.

Referring to FIG. 4, with further reference to FIGS. 1 and 2, flowchart 460 includes receiving plurality of video frames 130/230 (action 461). Plurality of video frames 130/230 may be received from client system 120, utilized by user 124 of system 100, via communication network 112 and network communication links 114 in action 461, by software code 140/240 of system 100, executed by hardware processor 104.

It is noted that the media content contained by plurality of video frames 130/230 may include AV content having both audio and video components, audio unaccompanied by video, and video unaccompanied by audio. In addition, or alternatively, in some implementations, the media content contained by plurality of video frames 130/230 may be or include digital representations of persons, fictional characters, locations, objects, and identifiers such as brands and logos, for example, which populate a VR. AR, or MR environment. Moreover, that media content may depict virtual worlds that can be experienced by any number of users synchronously and persistently, while providing continuity of data such as personal identity, user history, entitlements, possessions, payments, and the like. It is noted that unique identifier 128/228 may include content that is a hybrid of traditional audio-video and fully immersive VR/AR/MR experiences, such as interactive video.

Continuing to refer to FIG. 4 in combination with FIGS. 1 and 2, flowchart 460 further includes generating unique identifier 128/228 for association with plurality of video frames 130/230 (action 462). In some implementations, generating unique identifier 128/228 for plurality of video frames 130/230, in action 462, may include computing a hash, such as a raster hash for example, using plurality of video frames 130/230. For instance, in some of those implementations, such a hash may take the form of a Secure Hash Algorithm 256 (SHA-256) hash, for instance. Alternatively, it is noted that in some use cases a faster hashing algorithm may be used at the expense of a higher chance of collision, i.e., hash replication. To increase security when a faster and typically weaker hashing algorithm is used, that algorithm could be paired with a unique title identification of the media content contained by plurality of video frames 130/230, where the unique title identification may be obtained from an entity such as the Entertainment Identifier Registry (EIDR) for example. Unique identifier 128/228 for plurality of video frames 130/230 may be generated in action 462 by software code 140/240 of system 100, executed by hardware processor 104, and using unique identifier generation block 242.

By way of example, where plurality of video frames 130/230 includes an integer number "N" of video frames, unique identifier 128/228 may be computed as follows:

$$\text{Unique identifier } 128/228=\text{HASH(OUTPUT\_PROFILE}+M_1+M_2+\ldots M_N),$$

Where HASH( ) represents the application of a cryptographic hashing algorithm (e.g. SHA-256) to the elements included within the brackets ( ), OUTPUT_PROFILE is a token representing all parameters associated with a desired output encoding of encoded media file 150/250, each of the $M_i$ represent the canonical media identifier of a respective one of the N video frames, and the + operator denotes string concatenation.

Continuing to refer to FIG. 4 in combination with FIGS. 1 and 2, the method outlined by flowchart 460 further includes determining whether unique identifier 128/228 generated in action 462 is stored in media asset management system 116 (action 463). Action 463 may be performed by software code 140/240 of system 100, executed by hardware processor 104, through comparison of unique identifier 128/228 to the contents of unique identifier database 117/217 of media asset management system 116.

Referring to FIG. 4 in combination with FIGS. 1, 2, and 3, the method outlined by flowchart 460 further includes, when the determining performed in action 463 determines that unique identifier 128/228 is stored in media asset management system 116, identifying encoded media file 150/250/350 associated with unique identifier 128/228, where encoded media file 150/250/350 includes a plurality of encoded video frames (e.g., encoded video frames 354*a*-354*j*) corresponding respectively to plurality of video frames 130/230 (action 464). As noted above, in some implementations, encoded media file 150/250/350 may take the form of a MXF video track file, or may include a plurality of TIFF images. The presence of unique identifier 128/228 in unique identifier database 117/217 of media asset management system 116 indicates that the desired encoding of plurality of video frames 130/230 has previously been performed to produce encoded media file 150/250/350, which may be reused rather than reproduced/re-encoded, thereby advantageously avoiding the cost and inefficiency flowing from a redundant encoding of plurality of video frames 130/230.

Action 464 may be performed by software code 140/240 of system 100, executed by hardware processor 104, by reference to media asset management system 116. For example, in some instances, unique identifier 128/228 previously stored in media asset management system 116 may be cross-referenced to encoded media file 150/250/350 by the entry for unique identifier 128/228 stored in unique identifier database 217, thereby enabling system 100 to identify encoded media content 150/250/350 contemporaneously with determining that unique identifier 128/228 is stored in media asset management system 116. That is to say, although flowchart 460 lists action 464 as following action 463, that representation is merely exemplary, and in some implementations actions 463 and 464 may be performed in parallel.

Continuing to refer to FIG. 4 in combination with FIGS. 1, 2, and 3, as an alternative to action 464 described above, the method outlined by flowchart 460 further includes, when the determining performed in action 463 determines that unique identifier 128/228 is not stored in media asset management system 116, encoding plurality of video frames 130/230 to produce encoded media file 150/250/350 (action 465). It is noted that the omission of unique identifier 128/228 from unique identifier database 117/217 of media asset management system 116 indicates that encoded media file 150/250/350 has not previously been produced and is therefore not available for reuse. Consequently, encoding of plurality of video frames 130/230 is necessary and is advantageously not wastefully redundant. Action 465 may be performed by software code 140/240 of system 100, executed by hardware processor 104, and using video encoding block 244.

As noted above, in some implementations, plurality of video frames 130/230 may be encoded to produce encoded media file 150/250/350 as a MXF video track file, for inclusion in a media package such as an IMF package for example. As further noted above, depending upon the particular implementation, there may be advantages to constraining encoded media file 150/250/350 to include a predetermined creative interval of content, to have a predetermined number of video frames, or to include a sequence of video frames having a predetermined time duration. Referring specifically to FIG. 3, in some implementations encoded media file 350 may include encoded video frames 354*a*, 354*b*, 354*c* and 354*d* of a single shot 356 of video, while in other implementations, encoded media file 350 may include encoded video frames 354*a*-354*j* of a single scene 358 of video, as the terms shot and scene are defined above.

Continuing to refer to FIG. 4 in combination with FIGS. 1, 2, and 3, as an additional alternative to action 464 described above, the method outlined by flowchart 460 further includes, when the determining performed in action 463 determines that unique identifier 128/228 is not stored in media asset management system 116, storing unique identifier 128/228 associated with encoded media file 150/250/350 in media asset management system 116 (action 466). Action 466 may be performed by software code 140/240 of system 100, executed by hardware processor 104.

It is noted that although flowchart 460 lists action 466 as following action 465, that representation is merely exemplary. Because unique identifier 128/228 is associated with plurality of video frames 130/230, as well as with encoded media file 150/250/350, unique identifier 128/228 associated with encoded media file 150/250/350 is known prior to the encoding performed in action 465 and can be stored, in action 466, before the performance of action 466. In other words, in various implementations of the method outlined by flowchart 460, action 466 may precede action 465, may follow action 465, or may be performed in parallel with action 465, i.e., actions 465 and 466 may be performed contemporaneously.

Referring to FIG. 4 in combination with FIGS. 1, 2, and 3, the method outlined by flowchart 460 further includes, providing encoded media file 150/250/350 to user 124 of system 100 (action 467). In some use cases, action 467 may follow directly from action 463. In some implementations in which action 467 follows directly from action 463, hardware processor 104 of system 100 may execute software code 140/240 to obtain encoded media file 150/250 from media asset management system 116 in order to provide encoded media file 150/250/350 to client system 120 utilized by user 124, via communication network 112 and network communication links 114. However, in other implementations in which action 467 follows directly from action 463, hardware processor 104 of system 100 may execute software code 140/240 to instruct media asset management system 116 to deliver encoded media file 150/250/350 to client system 120 utilized by user 124.

In other use cases, action 467 may follow directly from action 465, or may follow action 466 subsequent to the performance of action 465. In those implementations, hardware processor 104 of system 100 may execute software code 140/240 to provide encoded media file 150/250/350 to client system 120 utilized by user 124, via communication network 112 and network communication links 114. It is noted that, in various implementations, action 467 may precede action 466, may follow action 466, or may be performed in parallel with action 466, i.e., actions 466 and 467 may be performed contemporaneously.

With respect to the method outlined by flowchart 460, it is emphasized that actions 461, 462, 463, 464 and 467, or actions 461, 462, 463, 465, 466, and 467, may be performed in an automated process from which human involvement may be omitted.

Thus, the present application discloses systems and methods for automating avoidance of media file encoding redundancies. The automated solution disclosed by the present application advances the state-of-the-art by providing a media file focused approach to identifying redundant content for inclusion in a media package, thereby advantageously enabling the cost reductions and efficiencies resulting from reuse of existing media file encodings.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A system comprising:

a hardware processor; and a system memory storing a software code;

the hardware processor configured to execute the software code to:

receive a plurality of video frames;

generate, based on a combination of a plurality of canonical identifiers each representing a different one of the plurality of video frames and a token representing parameters associated with a desired output encoding of an encoded media file, a unique identifier for association with the plurality of video frames;

determine whether the unique identifier is stored in a unique identifier database;

when determining determines that the unique identifier is stored in the unique identifier database:

identify the encoded media file associated with the unique identifier, the encoded media file including a plurality of encoded video frames corresponding respectively to the plurality of video frames;

when determining determines that the unique identifier is not stored in the unique identifier database:

encode the plurality of video frames to produce the encoded media file; and storing, in the unique identifier database, the unique identifier associated with the encoded media file.

2. The system of claim 1, wherein generating the unique identifier for association with the plurality of video frames comprises computing a hash using the combination of the plurality of canonical identifiers.

3. The system of claim 2, wherein the hash is paired with a unique title identification of a video.

4. The system of claim 1, wherein the encoded media file comprises a Media Exchange Format (MXF) video track file.

5. The system of claim 1, wherein the encoded media file comprises a single shot of a video.

6. The system of claim 1, wherein the encoded media file comprises a sequence of video frames having a predetermined time duration.

7. The system of claim 1, wherein the combination of the plurality of canonical identifiers is a deterministic combination of the plurality of canonical identifiers, and generating the unique identifier for association with the plurality of video frames is performed by applying a hashing operation to the deterministic combination of the plurality of canonical identifiers and the token.

8. A method for use by a system including a hardware processor and a system memory storing a software code, the method comprising:

receiving, by the software code executed by the hardware processor, a plurality of video frames;

generating, by the software code executed by the hardware processor based on a combination of a plurality of canonical identifiers each representing a different one of the plurality of video frames and a token representing parameters associated with a desired output encoding of an encoded media file, a unique identifier for association with the plurality of video frames;

determining, by the software code executed by the hardware processor, whether the unique identifier is stored in a unique identifier database;

when determining determines that the unique identifier is stored in the unique identifier database:

identifying the encoded media file associated with the unique identifier, the encoded media file including a plurality of encoded video frames corresponding respectively to the plurality of video frames;

when determining determines that the unique identifier is not stored in the unique identifier database:

encoding the plurality of video frames, by the software code executed by the hardware processor, to produce the encoded media file; and storing, by the software code executed by the hardware processor in the unique identifier database, the unique identifier associated with the encoded media file.

9. The method of claim 8, wherein generating the unique identifier for association with the plurality of video frames comprises computing a hash using the combination of the plurality of canonical identifiers.

10. The method of claim 9, wherein the hash is paired with a unique title identification of a video.

11. The method of claim 8, wherein the encoded media file comprises a Media Exchange Format (MXF) video track file.

12. The method of claim 8, wherein the encoded media file comprises a single shot of a video.

13. The method of claim 8, wherein the encoded media file comprises a sequence of video frames having a predetermined time duration.

14. The method of claim 8, wherein the combination of the plurality of canonical identifiers is a deterministic combination of the plurality of canonical identifiers, and generating the unique identifier for association with the plurality of video frames is performed by applying a hashing operation to the deterministic combination of the plurality of canonical identifiers and the token.

15. A non-transitory computer-readable storage medium having stored thereon a software code, which when executed by a system including a hardware processor, instantiates a method comprising:

receiving a plurality of video frames;

generating, based on a combination of a plurality of canonical identifiers each representing a different one of the plurality of video frames and a token representing parameters associated with a desired output encoding of an encoded media file, a unique identifier for association with the plurality of video frames;

determining whether the unique identifier is stored in a unique identifier database;

when determining determines that the unique identifier is stored in the unique identifier database:

identifying the encoded media file associated with the unique identifier, the encoded media file including a plurality of encoded video frames corresponding respectively to the plurality of video frames;

when determining determines that the unique identifier is not stored in the unique identifier database:

encoding the plurality of video frames to produce the encoded media file; and storing, in the unique identifier database, the unique identifier associated with the encoded media file.

16. The non-transitory computer-readable storage medium of claim 15, wherein generating the unique identifier for association with the plurality of video frames comprises computing a hash using the combination of the plurality of canonical identifiers.

17. The non-transitory computer-readable storage medium of claim 16, wherein the hash is paired with a unique title identification of a video.

18. The non-transitory computer-readable storage medium of claim 15, wherein the encoded media file comprises a single shot of a video.

19. The non-transitory computer-readable storage medium of claim 15, wherein the encoded media file comprises a sequence of video frames having a predetermined time duration.

20. The non-transitory computer-readable storage medium of claim 15, wherein the combination of the plurality of canonical identifiers is a deterministic combination of the plurality of canonical identifiers, and generating the unique identifier for association with the plurality of video frames is performed by applying a hashing operation to the deterministic combination of the plurality of canonical identifiers and the token.

* * * * *